United States Patent
Memon et al.

(10) Patent No.: US 11,822,925 B2
(45) Date of Patent: Nov. 21, 2023

(54) INTELLIGENT SCHEDULING OF COPROCESSOR EXECUTION

(71) Applicant: VMware, Inc., Palo Alto, CA (US)

(72) Inventors: Mazhar Memon, Austin, TX (US); Aidan Cully, St. Augustine, FL (US)

(73) Assignee: VMware, Inc., Palo Alto, CA (US)

( * ) Notice: Subject to any disclaimer, the term of this patent is extended or adjusted under 35 U.S.C. 154(b) by 359 days.

(21) Appl. No.: 17/201,855

(22) Filed: Mar. 15, 2021

(65) Prior Publication Data

US 2021/0200553 A1 Jul. 1, 2021

Related U.S. Application Data

(63) Continuation of application No. 16/226,695, filed on Dec. 20, 2018, now Pat. No. 10,949,211.

(51) Int. Cl.
 *G06F 9/38* (2018.01)
 *G06N 3/02* (2006.01)
 *G06F 9/54* (2006.01)
 *G06F 9/48* (2006.01)

(52) U.S. Cl.
 CPC .......... *G06F 9/3855* (2013.01); *G06F 9/3851* (2013.01); *G06F 9/54* (2013.01); *G06N 3/02* (2013.01); *G06F 9/3836* (2013.01); *G06F 9/3838* (2013.01); *G06F 9/3877* (2013.01); *G06F 9/4843* (2013.01); *G06F 9/4881* (2013.01); *G06F 9/545* (2013.01)

(58) Field of Classification Search
 None
 See application file for complete search history.

(56) References Cited

U.S. PATENT DOCUMENTS

| | | | | |
|---|---|---|---|---|
| 6,820,256 | B2 * | 11/2004 | Fleehart | G06F 11/3608 717/124 |
| 6,823,460 | B1 * | 11/2004 | Hollander | G06F 9/4484 712/E9.082 |
| 7,434,210 | B1 * | 10/2008 | Tucker | G06F 9/545 712/E9.082 |
| 8,984,494 | B1 | 3/2015 | Carrick et al. | |
| 9,424,079 | B2 | 8/2016 | Rossbach et al. | |
| 9,811,661 | B1 * | 11/2017 | Golovkin | G06F 21/566 |
| 10,146,736 | B2 * | 12/2018 | Park | G06F 9/3867 |
| 10,310,896 | B1 | 6/2019 | Kichak et al. | |
| 10,936,385 | B2 * | 3/2021 | Hu | G06F 9/4843 |

(Continued)

*Primary Examiner* — Eric Coleman
(74) *Attorney, Agent, or Firm* — Kim & Stewart LLP

(57) ABSTRACT

Execution of multiple execution streams is scheduled on at least one coprocessor. A software layer located logically between applications and the at least one coprocessor intercepts a first API call from an application and determines that a first execution stream is to be executed. Before scheduling the first execution stream, the software layer transmits a response to the application indicating that the at least one coprocessor is ready to execute another execution stream. The software layer intercepts a second API call from the application and determines that a second execution stream including one or more kernels is to be executed. The software layer determines that the one or more kernels does not have a dependency on the first execution stream. The software layer schedules the one or more kernels for execution prior to when the at least one coprocessor has completed execution of the first execution stream.

20 Claims, 3 Drawing Sheets

(56) References Cited

U.S. PATENT DOCUMENTS

| | | |
|---|---|---|
| 2011/0246998 A1 | 10/2011 | Vaidya et al. |
| 2014/0237477 A1* | 8/2014 | Cadambi ............... G06F 9/5044 718/103 |
| 2015/0379426 A1 | 12/2015 | Steele et al. |
| 2016/0210167 A1* | 7/2016 | Bolic .................. G06F 9/45558 |
| 2019/0050263 A1* | 2/2019 | Patel .................... G06F 9/5044 |

* cited by examiner

INTELLIGENT SCHEDULING OF COPROCESSOR EXECUTION

CROSS-REFERENCE

This application is a continuation of U.S. patent application Ser. No. 16/226,695, filed on Dec. 20, 2018, the entire contents of which are incorporated herein by reference.

FIELD OF THE INVENTION

This invention relates to computing systems that include co-processors.

BACKGROUND

As both the extent and complexity of computer processing have grown even in everyday modern life, there is a well-known, ever-increasing need for greater processing power. In many cases, even the increase in processing capability predicted by Moore's Law is insufficient.

One approach to handling some such tasks is "parallel computing", in which a task is decomposed into discrete sub-tasks that can be performed simultaneously by different processing systems. Certain processing tasks involve operations that can be performed by a system's main processor, but that are so specialized that an auxiliary processor—a coprocessor—may instead be more efficient, thereby leaving the more general operations to the main processor. An coprocessor thus often allows a processor to perform certain tasks more quickly and efficiently by offloading work to more specialized hardware, using some special purpose interfaces for sending work to, and retrieving results from, the coprocessor. Coprocessors are thus frequently included in systems to perform such operations as floating point arithmetic, encryption, string processing, I/O interfacing, and signal and graphics processing. Such coprocessors may be locally and/or remotely attached.

Coprocessors commonly execute either synchronously or asynchronously. A synchronous processor suspends the mainline processor's execution while the coprocessor runs. An asynchronous coprocessor, on the other hand, allows the mainline processor and the coprocessor to execute concurrently, typically by providing specific interfaces for moving work between the mainline processor and the coprocessor, and for indicating work status.

Despite the known advantages of using coprocessors, there is always a desire to use them more efficiently.

DETAILED DESCRIPTION

In broad terms, embodiments provide a coprocessor virtualization entity that examines and schedules and/or manipulates an execution dependency hierarchy. Other features may include a monitoring process to observe the state of Application Program Interfaces (APIs) relating to coprocessor execution and to use that as an input to the dependency hierarchy modification and commit. The concepts "coprocessor virtualization" and "execution dependency" will become clearer from the description below.

Figure 1:
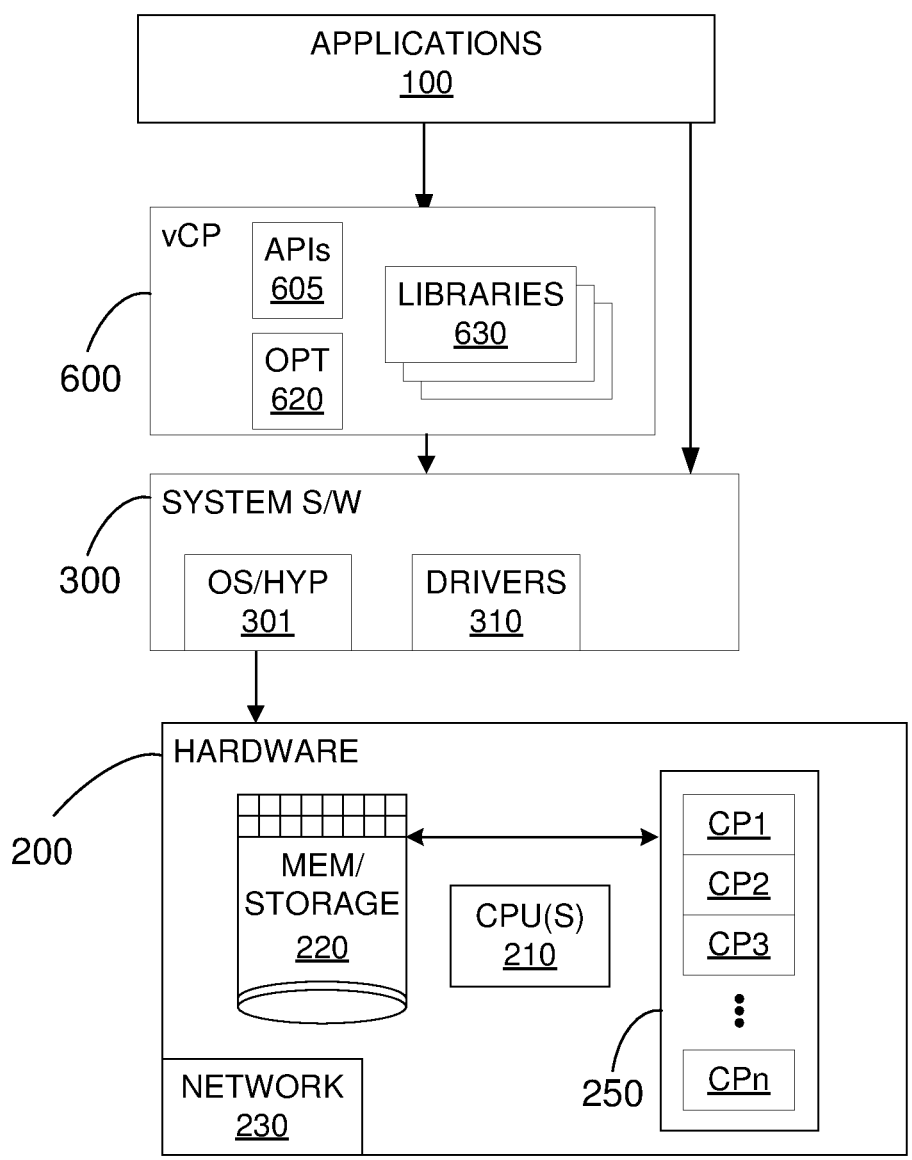
FIG. 1 illustrates, in a simplified form, the main components of a system that uses coprocessors and includes a virtual coprocessor engine.

FIG. 1 illustrates one example of a hardware/software stack in which applications 100 run on a host hardware platform 200, typically under the control of a system software layer 300 such as an operating system (OS) and/or hypervisor 301 (in the case where virtual machines are being run). The software layer 300 will typically include drivers 310 that control communication with respective peripheral devices. In addition to other standard components, the hardware platform will include one or more general processors 210, volatile and usually non-volatile (such as RAM, SSD, disk, etc.) memory and storage components 220, as well as components for communicating with other systems over a network and other peripherals as needed, for example, network interface components 230.

As is well understood, both user-level applications and system-level software processes are generally embodied as computer-executable code that is stored in memory/storage 220, in a device's dedicated storage/memory, etc., and that is then loaded into the appropriate to the processor(s) or coprocessors for execution. Some instructions, however, especially for specialized devices such as coprocessors, may also be permanently and/or temporarily stored in the devices themselves. In particular, the code comprising an execution kernel for a coprocessor may be loaded into internal memory of the coprocessor itself, or the coprocessor may share memory with the host processor.

In many modern computing environments, the application layer 100 includes, and sometimes is even totally comprised of, one or more virtual machines (not shown), in which case the system software 300 may include a system-level virtualization component such as a hypervisor (illustrated as part of the component 301), which acts as the virtual-to-physical interface. In some systems, the hypervisor is co-resident with the host OS, with both operating in a privileged mode; in other systems, the host OS intermediates some or all hypervisor commands to the hardware; in still other systems the hypervisor replaces the host OS altogether; and in systems without virtualized components such as VMs, no hypervisor may be needed and included at all. Embodiments of this invention do not presuppose VMs, although they may operate with VMs as with any other applications that call coprocessors; moreover, system programmers will be able to adapt embodiments to different host OS/hypervisor configurations, including those with no separate host OS at all.

The hardware platform 200 includes a set 250 of coprocessors CP1, CP2, CP3, . . . , CPn. The coprocessors 250 may be installed within a common hardware platform, but this is not always the case and is not required by embodiments. For example, some or all of the coprocessors could be located within other systems, accessible via any standard buses or networks, such that the concept of "hardware platform" may be broadened to include such "peripheral" or even remote coprocessors, such as coprocessors in cloud computing environments. Embodiments may also be used in other forms of distributed systems, such as a software-defined infrastructure (SDI). The applications 100 may also be running in a distributed processing environment, with more than one server handling processing tasks.

In the illustrated embodiment, an intermediate, interception "layer" 600, functioning as a virtualized coprocessor (vCP) entity, is installed in any known manner and resides logically between the applications 100 and the coprocessors. In the illustrated embodiment, the layer 600 resides in a non-privileged, user space, between the applications and the system software, without modification of the application or of kernel-level software running on the hardware platform. Security and data confidentiality may thereby be enforced without compromising the system with additional privileged code. Furthermore, unlike other approaches, additional features can be introduced into the vCP without having to change the underlying operating system, drivers, or virtual machine hypervisors. This configuration leads to other advantages such as ease of installation and use, portability, universality, and convenience, other configurations are possible. System designers may also choose, however, to install the vCP at the privileged level, and even into system software. It would also be possible to implement embodiments of this invention in hardware, in particular for specialized and well-defined computing tasks.

Furthermore, the vCP may be implemented so as to interface directly with applications 100 (as shown), or it may be configured to cooperate with and receive information from some more general virtualization and control layer (if included), which might, for example, include components that perform such tasks as memory profiling, general resource managers, encryption, memory protection, keeping track of and managing the distribution and pooling of the coprocessors in general (including determining which coprocessors an application may use), or of provisioning of the overall set of available memory resources.

Coprocessors typically have a "master-slave" relationship relative to the normal host CPU(s) 210 that runs the applications—an application is typically run on the host CPU(s) while certain computational tasks are offloaded to coprocessors for increased performance. Compute APIs, that is, APIs that are used by applications to leverage coprocessors, typically have explicit functions to offload computation and make host data available to the coprocessor, or vice-versa.

The API for each coprocessor, accessible by the overall system, is known and exposed to the applications that may wish to use it. Some of these APIs will be open, that is, public, whereas others may be customized for certain coprocessors. Even in the case of customized APIs, however, these will be known to all applications that may need to use the corresponding coprocessor. Since the coprocessors available at any given time are known to the system, their APIs are also known and applications 100 are programmed to properly format API calls to the coprocessors they wish to use.

Applications generally include various core functions, such as the routines needed to communicate processing requests to the operating system, to access the file system, allocate memory, and access common functional libraries for operations such as data compression, image manipulation, accelerated math functions, etc. Compute APIs, specifically, deal with the management of coprocessors, and execution and data flow, to make full and efficient use of the coprocessors. This includes dispatching data and compiled compute routines, returning status information, and synchronizing streams of execution between the coprocessors and other coprocessors, and the coprocessors and the host system.

Relevant in the context of embodiments of this invention is that parameters specifying not only which coprocessor(s) an application wishes to call, but also the instruction stream(s) to be executed on desired coprocessor(s) are available for inspection and analysis, since such instructions will be stored in identifiable portions of memory/storage. In addition, parameters specifying such other call-related requirements as required memory can be read or determined, since they are generally included in the corresponding API call issued by an application. As is well known, an API comprises routines and protocols that specify how software components should interact, how a software component such as an application may interact with a hardware component, etc. Note that, whereas different vendors may provide different coprocessors, the corresponding APIs may themselves be either vendor-specific or generic.

OpenCL (Open Computing Language—OCL) is a well-known and widely used language for cross-platform, parallel programming of diverse processors. OpenCL is often used, for example, in APIs. Various features of embodiments of the invention, in particular, APIs, coprocessor kernels and libraries, may therefore be implemented according to OpenCL specifications. This is just one design choice, however, and skilled programmers will know how to use any other parallel processing language or paradigm to implement these software components. Examples of such alternatives include CUDA, SQL, MPI, OpenMP, and OpenACC.

Some prototypes of embodiments of this invention, for example, were developed using NVIDIA graphics processing units (GPUs) as the coprocessors, as well as NVIDIA CUDA GPU drivers. (CUDA is a well-known parallel computing platform and API developed by and for NVIDIA GPUs.) Merely by way of example, and without limitation, various features of embodiments of the invention are therefore described below in terms (such as some commands) of OpenCL and/or CUDA. As mentioned above, however, skilled developers will know how to implement these features using other languages or formats. As just some examples, implementations may have coprocessors such as Artificial Intelligence Application-Specific Integrated Circuits (AI ASICS), Field-Programmable Gate Arrays (FPGA)s, Digital Signal Processors (DSPs), etc., which have their own respective programming languages/instruction sets and syntaxes.

In systems that use NVIDIA GPUs, the CUDA drivers typically reside either in the system software layer, or in a separate intermediate layer between applications and other system software, such as in the virtualization layer 600. Regardless of which language and format are used, embodiments, in particular the virtualization layer 600, are thus able to intercept a stream of API calls from applications and from the thus captured information determine which coprocessor each call is directed to.

In a standard OCL stack, characteristics of available coprocessors, including which devices these are, are available from OCL libraries, which may be included in the host platform or the devices themselves. An application may then use standard OpenCL calls through respective vendor Installable Client Drivers (ICDs) to create a standardization and abstraction layer for the application-specific libraries. As part of the call, the application will typically indicate any required execution parameters, as well as various inputs, which may include any type of value. The call may then pass to the designated target coprocessor, which may then run to complete the task.

Virtualized Coprocessor

In broad terms, the vCP 600 examines execution streams from one or more entities (such as applications 100, different processes within a single application, etc.) and "re-schedules" coprocessor calls transparently in such a way as to reduce execution waiting times. In some implementations, the vCP examines and analyzes execution streams while they are enqueued, that is, statically, for example, ones in a queue but not yet dispatched. In other implementations, execution streams may be analyzed dynamically, while they are executing. To accomplish this, the vCP 600 intercepts processor/coprocessor work coordination interfaces and may manipulate work-coordination primitives between any of the main processor(s) 210 and a coprocessor resource.

In the illustrated embodiment, the vCP 600 includes the code defining APIs 605, in particular, the APIs used to call the coprocessors. These APIs may be open, that is, public, whereas others may be customized for certain coprocessors. Even in the case of customized APIs, however, these will be known to the applications that may need to use the corresponding coprocessor. Since the coprocessors available at any given time are known to the system, their APIs are also known. As is known, applications 100 are programmed to properly format API calls to the coprocessors they wish to use and in many cases, the APIs that each application will call into may also be known in advance.

For many tasks often assigned to coprocessors, there may be one or more functions that are carried out so often, or are so specialized, that it is common to implement them in code in a way that is easy for different applications or processes to invoke, once or repetitively. Different programming languages may refer to these code modules as "subroutines", "subprograms", "functions", "methods", etc. Prototypes of embodiments of the invention were written in OpenCL, for example. In many cases, the code modules that implement these functions are made available in or accessible as "libraries" 630, which thus may provide various sets of functionality. Libraries may be open and/or custom and may include various existing system libraries. Libraries may be provided by device vendors, or by vendors of libraries themselves (such as mathematics library packages), or written by users themselves, such as for highly specialized and less common types of calculations. As just two of a substantially limitless number of examples, libraries exist in many different programming languages to perform matrix operations fast, or to numerically solve certain differential equations, etc.

Embodiments of this invention do not presuppose that the code stored to embody a library, that is, to perform some process, is necessarily a sub-routine, that is, some smaller part of a larger body of code; rather, libraries provided for different tasks could include entire applications as well. In other words, the difference between a sub-routine or an application is, in the context of this invention, mostly insubstantial, semantic, and non-limiting.

In the illustrated example, which reflects prototypes, OpenCL libraries are assumed, although this is not a necessary assumption in general—other implementations may not involve OpenCL at all. An OpenCL library typically has two components: a host component, which is usually (but not necessarily) general and often device-independent, and a device component, which is typically more specific to a given hardware vendor. For example, the code that defines the computational steps to invert a matrix may be the same regardless of which device is to carry out those computational steps, but different coprocessors that might be called to carry out the steps may have different input formats or floating-point number conventions. The libraries 630 may be implemented using any chosen data structure and may be stored in, for example, system memory 220. One or more of the libraries may instead be located within devices themselves, or within components of the system software, within applications, or even remotely, such as in a remote vendor or other server. As with other code, however, when it is time to execute the code in a library, it will be loaded into some high-speed memory component directly accessible by the processor(s) 210 or coprocessors 250.

Work coordination between execution contexts relies on two fundamental facilities, namely, 1) execution requests; and 2) barriers, where "barrier" is generically defined as a mechanism for gating some local activity on some remote activity's completion state. Assume some routine Y cannot start until another routine X has completed; for example, Y requires as input some data output from X, or the timing of execution of X and Y depend on some other scheduled event. These are just two examples, in which the vCP 600 may examine execution streams and determine, in these cases, whether there is a "release" barrier or a "synchronization" barrier: a "release/acquire" barrier guarantees that all data modifications that precede a "release" operation in one execution context will be visible to another execution context after it completes an associated "acquire" operation, and a "synchronization" barrier enforces that any scheduled actions complete before any post-synchronization actions may start.

The vCP 600 asynchronous coprocessor virtualization layer may manipulate the execution requests, so long as any operational barriers are honored. An execution request directed at a particular coprocessor may have side effects visible in multiple contexts, which may not all become operational at the same time. The vCP therefore preferably includes an optimization engine 620 component (or routine), which tracks when barrier-gated side-effects become operational, and to which contexts. These side-effects are knowable by examination of the respective instruction streams, and when they become operational is also observable using known techniques.

As just one example, a CUDA cuModuleLoad instruction may deliver a Just-in-Time (JIT) Parallel Thread Execution (PTX) kernel, and store the corresponding JIT code in a location accessible to the target coprocessor, such as an NVIDIA graphics processing unit (GPU). The kernel will therefore be observable and can be analyzed upon loading. The side effects of the loaded code may become operational to the CPU and therefore observable when the CPU executes a cuModuleGetFunction, but may not become operational to the GPU until the function pointer returned from cuModuleGetFunction is passed as an argument to cuLaunchKernel.

Any execution request must thus wait until the side effects that it relies upon have been satisfied before it can be processed. This implies that an execution request is situated within a dependency hierarchy. Embodiments of this invention provide a virtualization mechanism that allows one entity to have coherent knowledge of when side-effects become operational in different execution contexts, which in turn allows a virtualization entity to manipulate the execution dependency hierarchy.

A dependency hierarchy may be managed via two fundamental entities: 1) A barrier stream; and 2) a dependency object.

A "barrier stream" will generally correspond to some shared resource (such as a CUDA stream directed to a GPU), and enforces that multiple entities do not attempt conflicting interactions with the resource. A "dependency object" corresponds to an execution request that interacts with the shared resource. Dependency objects are placed at a defined position into zero or more barrier streams, and when all barrier streams for that dependency object reach the desired position, the dependency will become runnable. In other words, as long as all the necessary state preconditions are met from all relevant barrier streams, the dependency may be allowed to execute. Once run, all streams for the dependency object may advance one position, potentially making other dependency objects runnable.

The vCP layer may classify and operate with different types of dependency objects. One such object is a "stack-based" dependency object, which may provide a bridge between pass-through virtualization (wherein the virtualization layer 600 simply forwards a request from a client to the physical layer) and execution rewriting (instructions in a stream are actually changed) and other forms of intelligent virtualization (which dependency manipulation enables). A stack-based dependency object blocks an invoking thread until a corresponding dependency can be satisfied, allowing the "run" operation to rely on stack-allocated variables. This is particularly useful when using closure functions, such as C++ lambdas, that can capture a calling stack's variables when executing the dependency. Embodiments may operate with at least two forms of stack-based dependency object:

On-stack dependency objects, in which the dependency may be directly run in the calling thread when the dependency becomes runnable; and Work-stealing dependency objects, in which the dependency may be run from a distinct execution thread, such as the one in which it was detected that the object had become runnable.

The mechanism by which the vCP 600 may intercept an execution request will generally be coprocessor-specific, but will be within the skill of systems programmers once the coprocessor is specified. An API call from an application may, for example, indicate an execution request. Once an execution request is intercepted, it may be examined to determine which execution barriers the request relies upon, and which it provides. For example, in one prototype, the standard CUDA library instruction cuModuleLoad was used to provides a CPU-side barrier that gated execution of the CUDA cuModuleGetFunction instruction, and a GPU-side barrier that the module has been JIT-ed, and was thus available to the GPU. Similarly, the cuModuleGetFunction instruction provided a CPU-side barrier that gated execution of cuLaunchKernel, and a GPU-side barrier to obtain the GPU function pointer from the module returned from the cuModuleGetFunction instruction. As another example, the cuLaunchKernel provided a GPU-side barrier that prevented any other entity from being executed on the stream until the named kernel completed operation.

Figure 2:
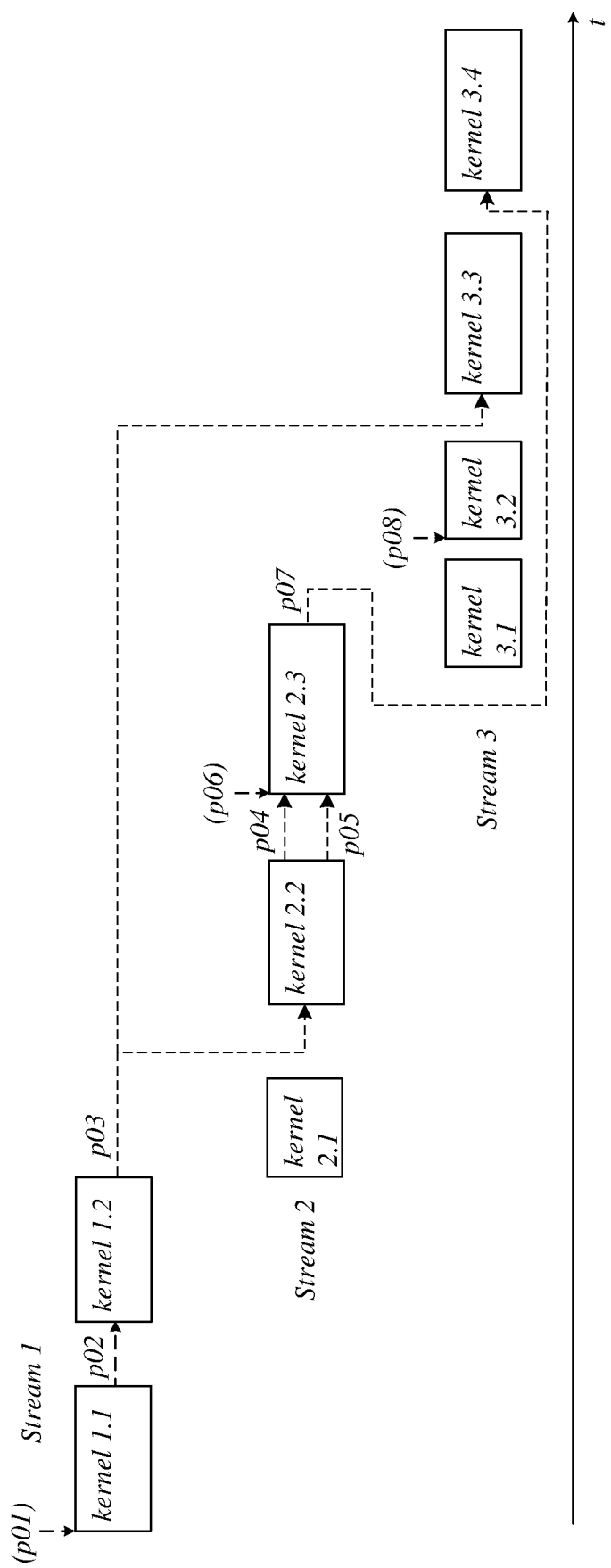
FIG. 2 illustrates dependencies between different execution streams.

See FIG. 2, which illustrates a simple three execution-stream (Stream 1, Stream 2, Stream 3) scenario. In typical actual cases, there will be many more independent threads of execution but the principles will be the same. In this example, Stream 1 comprises two coprocessor kernels (kernel 1.1, kernel 1.2) to be dispatched in order, Stream 2 comprises three kernels (kernel 2.1-kernel 2.3) to be dispatched in order and Stream 3 comprises four kernels (kernel 3.1-kernel 3.4) to be dispatched in order. At the left-most "edge" of some of the kernels, in parentheses, with an "inward"-pointing arrow, are "values" (p01, p06, p08) that the respective kernel needs in order to be able to execute and that are input as part of their respective calls, unrelated to any other stream; as just one example, these might be such inputs as an initial data set that is to be processed by a GPU. Values such as p02, p03, p04, p05, and p07, however, are made available by other execution kernels as either outputs, or values that, once created, will otherwise remain constant (as shown by absence of further write instructions to the corresponding memory address) for the remainder of execution of the respective kernel and that are accessible to other entities, in particular, to the vCP.

In existing systems, because kernels 2.2 and 3.3 as illustrated require input of p03, which is a "product" of Stream 1, it might be necessary to delay the start of execution of both Stream 2 and Stream 3 until Stream 1 has completely finished executing, that is, until kernel 1.2 has completed. Similarly, start of execution of Stream 3 might need to wait even longer, until Stream 2 has completed, so that p07. will be available to kernel 3.4.

In embodiments of this invention, however, the optimization engine 620 (or any other component in the vCP 600) first accesses the code defining the stream Stream 1 and determines that p03 will be available no later than the end of execution of kernel 1.2 and that p07 will be available no later than the end of execution of kernel 2.3. This means that when p03 is available, kernel 2.2 will have all the inputs it needs to begin execution as soon as kernel 2.1 has also finished execution, and kernel 3.3 may start execution as soon as kernel 3.2 has also finished execution. On the other hand, kernel 2.1 and kernel 3.1 are not dependent on any other kernel, and kernel 3.2 depends only on completion of the previous kernel kernel 3.1 in its own Stream 3 and input of p08.

Figure 3:
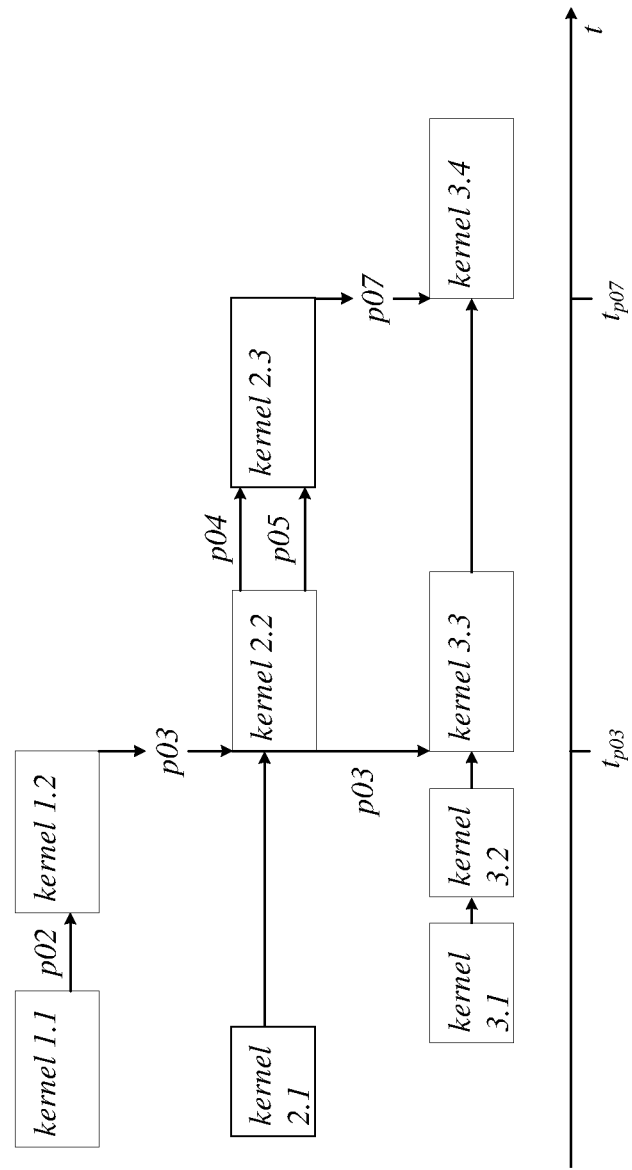
FIG. 3 shows a simplified example of optimized temporal alignment of different execution streams.

The optimization engine 620 may therefore "temporally pack" the different kernels so as to reduce waiting times, and thus the total execution time by rearranging the execution streams as illustrated in FIG. 3: kernel 2.1 and kernel 3.1 may be dispatched at any time; kernel 2.2 may be dispatched any time after $t_{p03}$ when p03 is available and kernel 2.1 has finished execution; kernel 3.2 may be dispatched as soon as kernel 3.1 has finished execution and p08 is provided; kernel 3.3 may be dispatched any time after $t_{p03}$ when p03 is available and kernel 3.2 has finished execution; and kernel 3.4 may be dispatched any time after $t_{p07}$ when p07 is available and kernel 3.3 has finished execution. In short, using this embodiment, there is no need to wait for any other execution stream to complete execution before dispatching kernel 2.1 and kernel 3.1, that is, Stream 2 and Stream 3. Thus, the optimization engine "temporally aligns" execution kernels according to the availability of their dependencies.

In the embodiment described above, it is assumed that values generated by a kernel will not be available until the kernel has completed execution. In most cases, this is an acceptable assumption, not only because kernels are often small and execute fast, but also because of the overhead required to observe and analyze kernels as they are executing. In some cases, however, it may be possible for the optimization engine 620 to examine a kernel's code in advance of it running, and to observe at what point during execution of the kernel a parameter receives a value that is not changed (for example, its memory space is not written to again) during the remaining kernel execution. Kernels designed to follow a protocol such as NCCL may, for example, allow an external process (such as the optimization engine 620) to overcome the known halting problem and monitor its progress. In such cases, the optimization engine 620 and vCPU may improve the expected efficiency of temporally aligned scheduling even further by observing such kernel dependency points during kernel execution. As a simple example, assume that the optimization engine 620 examines the kernel 1.2 code and observes that p03 is computed "finally" at about a half-way point in the code. As kernel 1.2 is running, the vCPU may note that the kernel has assigned the "final" to p03 and may then dispatch kernel 2.2 and kernel 3.3 immediately, assuming other required kernels in Stream 2 and Stream 3 have completed and p08 is available.

The optimization module 620 is thus provided for determining an "optimal" scheduling (that is, temporal execution "alignment") of the different streams/kernels in any chosen sense, and the chosen optimization routine could also be made to be adaptive and dynamic. In broad terms, the different estimated latencies caused by different dependencies may be used as the inputs to a cost function of time, whereby the cost is to be minimized.

The optimization module 620 may also operate at least partially predictively. For example, it may make the assumption that all instructions may be executed in the same time. In other words, in this case, estimated "time" is simply a function such as a count of instructions. It is known, however, that some instructions, such as those in CUDA, typically require more CPU cycles to complete than others, that memory accesses take an at least approximately known factor of time longer than, say, simple arithmetic operations, and that waiting for user input can take even longer. The estimated time of availability of values, that is, removal of barriers, may then be estimated more precisely so as to affect the "optimal" scheduling accordingly. This estimated time may be an estimate of the time when a particular kernel will complete execution, or, if it is externally observable during execution, when a particular needed value will become available.

The example of optimization of kernel scheduling by a process of "temporal bin-packing" is simplified not only in terms of how many streams are illustrated (in actual implementations, there may be orders of magnitude more streams), but also in terms of the nature of the illustrated dependencies. In FIG. 2, the estimated time of need and availability of various forms of inputs are the illustrated dependency. In other use cases, other types of dependencies may also arise. For example, in implementations in which streams are retrieved from different remote locations, that is, not from systems co-resident with the hardware platform 200 that includes the coprocessors 250, varying network latency is an example of another type of dependency: It may thus be more efficient to run a kernel received over a relative faster connection as far as possible, for example, even if its nominal total execution time might be longer. Similarly, it may be more efficient to dispatch and execute several relatively smaller kernels at once and wait to dispatch a kernel that requires a relatively large amount of the coprocessor resources. Of course, depending of the nature of the kernels, the opposite may also be true in some cases—there may in general not be a single "closed", "global" solution for optimal scheduling, but embodiments of the invention will in most cases still provide an improvement over prior art solutions.

In many embodiments, analysis of dependencies and optimization of scheduling may be done in advance of actual kernel dispatch. In some cases, there will be enough time for simulation of the dispatch and running of the various streams, under different temporal alignment scenarios. As one possibility, one coprocessor could be "reserved" and used to feed the inputs to the different streams.

In other cases, the same or similar loads may be expected—for example, the same applications or routines within applications may run repeatedly. In such cases, actual execution times may be observed and measured and used to better optimize scheduling for subsequent runs. In other cases, such as where there is a large number of streams (and thus typically less predictability) running simulations or results of actual run-time observations may be used to train a neural network to converge on (and be dynamically updated for) an optimal schedule.

One way to obtain the training data for a neural network would be to reserve some coprocessor capacity (which could be relatively small) with a few parameters to train. Note that coprocessors such as GPUs typically have the ability to run multiple programs simultaneously. Different kernels may then be fed to the coprocessor and the execution time of the different kernels may be measured and input as a training parameter to the neural network. A cost function such as (full utilization time)−(amount of time actually utilized) could then be evaluated and minimized. Through every repetition of this routine, the utilization measurement may be fed as a gradient to the neural network, which may then determine an optimal scheduling "alignment", and the various kernels may then be scheduled for execution accordingly. Using a neural network is, however, only one of many options for determining (via computation and/or modelling) an optimal (in any sense) scheduling based on either static analysis or dynamic observation, or both. Just a few such alternatives include Bayesian optimization, decision trees, greedy bin-packing, etc.

As mentioned above, optimization may also be done with respect to network communication latency. For example, if execution is taking place on a shared host with direct access between coprocessors, but it moving across a network, which introduces different latency, execution may be re-scheduled such that the different network latencies become values in the cost function to be minimized. As one example, if several dependency objects depend on a particular kernel running, then it may be most efficient to prioritize that kernel and dispatch it over the fastest channel so as to minimize the waiting time of the dependent kernels.

Similarly, the amount of data and memory space required by a stream may be treated as other values used for scheduling optimization, as may the amount of data that must be swapped into and/or out of a coprocessor. This would reduce or even eliminate the need for such conventional methods as page walking. Moreover, if one dependency is space, and, for example, an SD drive becomes available as a backup device, then it could easily be added into the optimization computations, just as a change in the number of available coprocessors may.

One other factor that may be included in the optimization is the number of coprocessors currently available, and/or their type, and/or their current load—having more coprocessors available will in general allow for more flexible scheduling. Note that this may also be a dynamic factor, such that the optimal scheduling maybe re-determined if the number of coprocessors changes, which increases utilization of a cluster. The vCP may also adjust the number of coprocessors used transparently: Assume for example that an application requests four GPUs, but the hardware platform has a cluster of coprocessors available that includes additional GPUs. The vCP could then send more traffic to another "unrequested" GPU, thus, in effect, transparently scaling out. Note that this is different from conventional load balancing, which usually works at a higher, application level. Using this embodiment of the invention, however, such scaling out may be done dynamically, without the need for explicit assignments.

Dependencies may be represented in any known matter in a data structure, which may be stored in the memory space of, for example, the vCP 600. A graph may, for example, be created that represents which values are needed by which kernels, which may then be used to establish an execution order. This value graph may, for example, order the values by kernel that provides them, by kernel and order within kernel, by estimated time of availability, or any other ordering.

In addition to being able to use a dependency graph (or other data structure) for scheduling, replay elements of the dependency data structure may be used as a diagnostic tool in case of execution fault. For example, upon migration of kernels between coprocessors, the dependency graph may be used to reproduce the corresponding command stream. As one example, note that CUDA implements a cross-platform, intermediate representation, that is, a "common language" into which applicants' NVIDIA GPU-directed instructions are "translated" upon compilation. The same program can thereby be run on different GPUs. Using the dependency relationship that this invention determines, differences in application instruction sets can thereby be ignored, such that embodiments of this invention may be used to advantage even with heterogeneous coprocessor resources. Moreover, embodiments may be used for such purposes as load-balancing.

In one embodiment, kernels are dispatched to the respective coprocessors that are specified by the calling applications. In some cases, kernels may be dispatched on different coprocessors, whereas, in other cases, the execution streams may be loaded simultaneously on the same coprocessor. In other embodiments, the virtualization layer 600 may transparently re-route kernel dispatch to some other functionally equivalent coprocessor—as long as the results are returned to the calling application as expected, the application will not "know".

In the examples mentioned above, the virtualization layer (that is, the vCP 600) determines dependencies and barriers in order to more efficiently use shared coprocessor resources. In some contexts, there is also a need to better manage transitions between serial and parallel processing (in both directions). A transition from serial to parallel processing is a "split", whereas a parallel-to-serial transition is a "joining". An embodiment of this invention may be used to more efficiently handle such operations as well, by enabling a common scheduling practice: By knowing the order of dependencies, the system also knows which streams/kernels must execute in which order, or how different "split" streams executing in parallel should be temporally aligned.

Other embodiments may also manipulate other aspects of an execution stream. In a "Split Synchronization" embodiment, the general CPU invokes a copy of memory from host memory to a device (such as with a cuMemcpyHtoDAsync instruction in a CUDA steam), and, upon completion of this instruction, indicates that the copied-from memory can be re-used. The coprocessor (such as a GPU in an NVIDIA implementation) may use the same command's completion to prevent later actions in the stream from starting. This allows completion to be signaled to the CPU "early", by copying the memory to a scratch buffer, and then from the scratch buffer to the remote coprocessor. The CPU may then be signaled that the memory copy action (memcpy) has completed after the memcpy(to scratch), and may signal the GPU that the memcpy has completed on "true" completion.

Events may also be merged. A fork/join pattern is common in CUDA programs, for example: memory is prepared for execution on one stream, and other streams are notified that the memory is ready by having a single cuEventRecord on the source stream, and each "worker" stream might execute cuStreamWaitEvent(hSteam, hEvent, . . . ) on that event (the "fork"). The CUDA instruction cuStreamWaitEvent causes future work submitted to the relevant stream (hSteam) to wait until the specified event hEvent reports completion, before beginning execution.

The stream hEvent will wait only for the completion of the most recent host call to execute cuEventRecord( ) on hEvent. Once this call has returned, any functions (including cuEventRecord( ) and cuEventDestroy( )) may be called on hEvent again, and the subsequent calls will not have any effect on hEvent.

Embodiments may also implement a "Join" operation. In such a case, each CUDA worker stream may end with a cuEventRecord instruction on a distinct CUevent instruction, and the "join" stream may then issue a new cuStreamWaitEvent instruction for each of those worker streams. This pattern is efficient if inter-stream communication is computationally cheap, but not as much if inter-stream communication is expensive, as it tends to be in inter-node scenarios. A virtualization entity such as vCP may in some cases improve performance by detecting this pattern, and having all "join" cuEventRecord send their results to an accumulator stream on the transmitting node, and send the number of participating source streams to the remote host when the appropriate point in the accumulator is reached.

"Lazy Dependencies"

In some implementations, the entire set of streams to be run may be available for dependency analysis and scheduling optimization. For example, all applications 100 may be resident on the same platform as the coprocessors 250 themselves. This will, however, often not be so. For example, in some implementations, one or more applications may access the main processor and coprocessors via one or more networks or even different buses or channels. In such cases, the streams and kernels to be dispatched may not be known, in part or at all, until actual coprocessor calls are made.

An embodiment that evaluates and schedules according to "lazy dependencies" may then be employed, and may be applicable in the general case of involving asynchronous coprocessor execution. As a summary: When client processes request a coprocessor resource, the vCP may respond with a one-to-one virtual representation of that resource, and instead of responding with the actual resource, it responds with a "promise" as an opaque handle (as opposed to, for example, a CUDA handle) that causes the client to pipeline data into being available. The client thus sends a larger section of command stream than it would otherwise, which in turn provides more data to analyze for the purpose of optimizing scheduling on the coprocessor. This in turn enables the vCP 600 to change the organization of the client executable/command stream.

The nature of asynchronous coprocessor execution is that the work scheduler (in particular, the main processor(s) 210) does not require the work's results (as generated by the coprocessor) until some later point. As described above, the vCP 600 may know which aspects of the scheduled work become visible to and/or usable by the processor or a coprocessor, and at which points. In general, the main processor and a coprocessor do not depend on the same result at the same time.

In some situations, the processor-visible result will indicate that the coprocessor is ready for some dependent operation to be scheduled. As one example, in a CUDA environment, a cuModuleLoad( ) may return a CUmodule output object, indicating that a set of executable code has been compiled and loaded into the coprocessor. Note that this doesn't actually execute code, but rather means that the coprocessor is ready to find the executable address of some callable function via cuModuleGetFunction, and is ready to execute a previously found function via cuLaunchKernel. In such a case, the vCP 600 may tell the client application that the coprocessor is ready for later execution before it actually is.

In one embodiment, the vCP 600 intercepts the later work-scheduling call, and delays dispatching it to the respective coprocessor until the previously-scheduled action has actually completed. Continuing with the example above, the vCP 600 may allocate a "promise" object from cuModuleLoad, and return that to the CPU 210. The CPU then does not examine the contents of the "promise" object, but passes the "promise" back to the vCP to execute cuModuleGetFunction. The vCP thus sees that the "cuModuleLoad" promise is not yet ready, and so either: 1) waits for the cuModuleLoad promise to be fulfilled before invoking cuModuleGetFunction; or 2) creates another promise object, which will be fulfilled when: a) the cuModuleLoad promise is fulfilled, and b) cuModuleGetFunction uses the result of the cuModuleLoad promise to fill in an execution address. In the latter case (responding to a promise with a promise), eventually the CPU 210 may use the "cuModuleGetFunction" promise to invoke a cuLaunchKernel. The vCP will then see that cuLaunchKernel was given a cuModuleGetFunction promise object, and then either: 1) wait for the cuModuleGetFunction promise to be fulfilled before invoking cuLaunchKernel; or 2) record the cuLaunchKernel invocation as another "promise" object. Promise objects may thus be "chained" substantially indefinitely, until the CPU actually requires some real result of the coprocessor, which will prevent CPU forward progress until all required promises have been filled.

In general, according to embodiments of the invention, a "dependency" is any unit of execution that the vCP needs to perform to make processor-coprocessor interaction proceed correctly. In a trivial case, little to no dependency management may be needed at all: functions requested by the CPU may simply be executed in the order that the CPU requested them, using one-to-one mappings from device handle objects to virtualized device handle objects. For more advanced coprocessor virtualization, however, the vCP may rewrite client requests into more advanced forms, while preserving visible semantics. Consider an example in a CUDA environment, in which the dependency of interest is memory-related:

A cuMemcpyHtoD call is expected to immediately change the contents of memory on a GPU, such that the CPU would be allowed to overwrite the host memory after that call returns. The vCP may preserve those semantics by copying, instead, from host memory to a scratch memory buffer (exclusively allocated to the vCP), and create a promise object to move data from the scratch memory to the GPU. Any later operation that might rely on that memory state would be represented as a dependency, which only becomes unblocked from execution when the memory-move promise is fulfilled. Such a dependency may be represented as described above (such as in a graph data structure), and may be used to ensure the data is on the GPU when it needs to be.

Dependencies may also be a function of execution speed: Asynchronous coprocessors in particular will generally run more efficiently if a backlog of work is available to them for execution. The vCP will often dispatch less work (or the same amount of work) to a coprocessor than the client application has submitted to the vCP, since, sometimes, work cannot be sent to the coprocessor until after some required data is supplied over the network. As such, the vCP will be aware of the dependencies that prevent some known work from being scheduled. The vCP will also have some (typically imperfect and incomplete) awareness of how long it may take for the coprocessor to run through the work that's currently been scheduled for it.

Currently, the CUDA work queue is in-order, that is, the order of execution does not change once it's dispatched to a coprocessor). On the other hand, OpenCL and other coprocessor/language systems support out-of-order execution. The optimization described here may be applied in both regimes. The vCP thus uses knowledge of when the coprocessor work queue will run empty to determine which dependencies should be run with higher priority; alternatively, or in addition, the vCP may use knowledge of whether the GPU work queue is running low or not to determine whether and how to rewrite client calls to the vCP. For example, in host-to-device operations, if the coprocessor is about to run empty, then it may be efficient for the vCP to block the caller until the coprocessor receives the memory instead of using an intermediate scratch buffer to hold the pending memory—adding a scratch buffer improves the pipelineability of the memory move operation, but it may also take more time than avoiding the use of scratch memory.

The time it takes for a coprocessor to execute all or part of a stream may be estimated (as mentioned above), or (if possible) measured or estimated beforehand, for example by doing a "test run" on an available coprocessor, or it may be observed in actual use, with the time fed back to the optimization engine 620 for future use. As one example, assume different coprocessors are on different nodes (such as different servers) and that a stream is running on one coprocessor and has 10 ms of processing time left. If 10 ms is schedulable for one coprocessor but it must wait for data to come across network (or bus or channel) from another coprocessor, the vCP may communicate with other coprocessor's node to tell it it requires completion in 10 ms; the other node may then include information into its own coprocessor-scheduling optimization by increasing the priority of its coprocessor so as to better complete in 10 ms. Note that this also illustrates that use of the optimized scheduling features of embodiments of the invention are not limited to single hardware platforms 200; rather, embodiments described here may also be used, for example, where coprocessors are on different nodes, such as in different servers, and respective vCPs communicate over a network.

We claim:

1. A method of scheduling execution of multiple execution streams on at least one coprocessor, comprising:
   intercepting a first application programming interface (API) call from an application, wherein the first API call is intercepted by an interception software layer that is installed in a non-privileged, user space, between the application and kernel-level software running on a hardware platform that includes the at least one coprocessor;
   determining by the interception software layer from the first API call that a first execution stream is to be executed on the at least one coprocessor;
   before scheduling the first execution stream for execution on the at least one coprocessor, transmitting by the interception software layer a response to the application indicating that the at least one coprocessor is ready to execute another execution stream;
   after transmitting the response to the application, intercepting by the interception software layer a second API call from the application;
   determining by the interception software layer from the second API call that a second execution stream including one or more first kernels and one or more second kernels is to be executed on the at least one coprocessor;

determining by the interception software layer that the one or more first kernels does not have an execution dependency on the first execution stream and that the one or more second kernels has an execution dependency on the first execution stream; and scheduling by the interception software layer the one or more first kernels for execution on the at least one coprocessor prior to when the at least one coprocessor has completed execution of the first execution stream.

2. The method of claim 1, further comprising scheduling by the interception software layer the one or more second kernels for execution on the at least one coprocessor after the at least one coprocessor has completed execution of the first execution stream.

3. The method of claim 2, wherein the at least one coprocessor includes first and second coprocessors, and wherein the interception software layer schedules the first execution stream for execution on the first coprocessor and the second execution stream for execution on the second coprocessor.

4. The method of claim 1, further comprising: before scheduling the first execution stream for execution on the at least one coprocessor, generating an object in response to the first API call indicating that executable code of the first execution stream has been compiled and loaded into the at least one coprocessor.

5. The method of claim 1, further comprising:
determining the execution dependency of the one or more second kernels statically;
adding the first and second execution streams to an execution queue; and
determining the execution dependency of the one or more second kernels from the first and second execution streams when they are in the execution queue.

6. The method of claim 1, further comprising determining the execution dependency of the one or more second kernels dynamically, while the first and second execution streams are executing.

7. The method of claim 1, wherein the execution dependency of the one or more second kernels is a function of contents of memory, and wherein the interception software layer loads contents of a memory device of a host computing device to a memory buffer that is allocated to the interception software layer before transferring the loaded contents of the memory device from the separate memory buffer to memory of the at least one coprocessor.

8. The method of claim 1, wherein the execution dependency of the one or more second kernels is a function of execution speed.

9. The method of claim 1, wherein the execution dependency of the one or more second kernels is a function of data that must be received over a network, and wherein the interception software layer does not schedule the one or more second kernels for execution on the at least one coprocessor until receiving the data over the network.

10. The method of claim 1, wherein the scheduling of the first and second execution streams is performed using a neural network, Bayesian optimization, decision trees, or greedy bin-packing.

11. A data processing system comprising:
a hardware platform that includes a processor and a kernel-level software running on the hardware platform;
an application comprising computer-executable code executable on the processor;
at least one coprocessor, the application generating a plurality of execution streams for execution on the at least one coprocessor; and
an interception software layer installed in a non-privileged, user space, logically located between the application and the kernel-level software, and being provided for:
intercepting a first application programming interface (API) call from the application;
determining from the first API call that a first execution stream is to be executed on the at least one coprocessor;
before scheduling the first execution stream for execution on the at least one coprocessor, transmitting a response to the application indicating that the at least one coprocessor is ready to execute another execution stream;
after transmitting the response to the application, intercepting a second API call from the application;
determining from the second API call that a second execution stream including one or more first kernels and one or more second kernels is to be executed on the at least one coprocessor;
determining that the one or more first kernels does not have an execution dependency on the first execution stream and that the one or more second kernels has an execution dependency on the first execution stream; and
scheduling the one or more first kernels for execution on the at least one coprocessor prior to when the at least one coprocessor has completed execution of the first execution stream.

12. The data processing system of claim 11, wherein the interception software layer is further provided for scheduling the one or more second kernels for execution on the at least one coprocessor after the at least one coprocessor has completed execution of the first execution stream.

13. The data processing system of claim 12, wherein the at least one coprocessor includes first and second coprocessors, and wherein the interception software layer schedules the first execution stream for execution on the first coprocessor and the second execution stream for execution on the second coprocessor.

14. The data processing system of claim 11, wherein interception software layer is further provided for: before scheduling the first execution stream for execution on the at least one coprocessor, generating an object in response to the first API call indicating that executable code of the first execution stream has been compiled and loaded into the at least one coprocessor.

15. The data processing system of claim 11, wherein the interception software layer is further provided for:
determining the execution dependency of the one or more second kernels statically;
adding the first and second execution streams to an execution queue; and
determining the execution dependency of the one or more second kernels from the first and second execution streams when they are in the execution queue.

16. The data processing system of claim 11, wherein the interception software layer is further provided for determining the execution dependency of the one or more second kernels dynamically, while the first and second execution streams are executing.

17. The data processing system of claim 11, wherein the execution dependency of the one or more second kernels is a function of contents of memory, and wherein the interception software layer loads contents of a memory device of a host computing device to a memory buffer that is allocated to the interception software layer before transferring the loaded contents of the memory device from the separate memory buffer to memory of the at least one coprocessor.

18. The data processing system of claim 11, wherein the execution dependency of the one or more second kernels is a function of execution speed.

19. The data processing system of claim 11, wherein the execution dependency of the one or more second kernels is a function of data that must be received over a network, and wherein the interception software layer does not schedule the one or more second kernels for execution on the at least one coprocessor until receiving the data over the network.

20. The data processing system of claim 11, wherein the scheduling of the first and second execution streams is performed using a neural network, Bayesian optimization, decision trees, or greedy bin-packing.

* * * * *